3,239,359
PROCESS OF MAKING A BAKED EDIBLE CITRUS PEEL PRODUCT

Glen L. Stansbary, Ontario, and Peter L. Douglas, Glendora, Calif., assignors to Cal-Flo Corporation, Whittier, Calif., a corporation of California
No Drawing. Filed Apr. 13, 1964, Ser. No. 359,505
22 Claims. (Cl. 99—83)

This application is a continuation-in-part of our applications Serial Nos. 194,179 filed May 11, 1962 and 265,374 filed March 15, 1963, both now abandoned.

A primary object of the present invention is to provide a novel cereal produced from the albedo portion of the peel of citrus fruit.

Citrus albedo is a by-product of the citrus industry which is available in large quantities. Some of this material is utilized in animal feeds and small amounts are used in the production of glacéd or candied fruit peel. Additional quantities of the albedo as such or the entire citrus peel are used as source materials from which chemicals such as flavinoids are extracted. However, tremendous quantities of this albedo material are merely disposed of as waste, notwithstanding the fact that the albedo contains valuable nutritive elements and vitamins. An important object of the present invention is therefore to provide a novel utilization of citrus albedo, more particularly, a novel product and process for the production of an albedo-based food product, comprising a pleasant tasting cereal for human consumption.

Other objects and advantages of the present invention it is believed will be readily apparent from the following detailed description of preferred embodiments thereof.

For use in carrying out the process of the present invention, citrus albedo from any source may be utilized, but a large source of albedo in excellent condition for processing is the by-product from commercial citrus juicing and oil recovery operations wherein the flavedo is separated, as by shaving, from the albedo, either prior to or after the juicing extracting operation, for recovery of the oil in the flavedo.

In carrying out the preferred process of the present invention, the albedo, free from the flavedo, is first treated to remove therefrom at least a portion of the water-soluble constituents so as to eliminate from the final product the characteristic "bitter" albedo flavor. This is accomplished, for example, by extracting the albedo pieces, either as they come from the oil recovery operations, or preferably ground into relatively small particles, with water or other aqueous media, such as for example a dilute sodium chloride or calcium chloride solution. Preferably the albedo is comminuted and thoroughly blended with the aqueous medium to form a relatively thin paste or purée which is boiled for an adequate length of time to extract at least a portion of the bitter constituents. The extraction and/or leaching operation is most advantageously carried out under conditions not only to remove sufficient of the bitter constituents to eliminate a bitter flavor in the final product, but also to minimize the removal of the pectin and sugars contained in the albedo.

After the extraction operation, the mixture of solids and liquids is treated to remove therefrom the excess or free liquid, as by draining upon a fine screen, filtration, etc. It is important, however, to minimize loss of the nutrients in the albedo, but it is also necessary to dewater the material sufficiently to permit carrying out the subsequent handling and baking steps. In this connection it has been found that the addition of a small amount, for example, as little as 0.1%, based upon the weight of the albedo, of sodium hexametaphosphate to the mixture serves to increase its consistency or apparent viscosity, making it easier to handle the mixture for baking and to minimize the amount of water removed after the extraction step. It is believed that the sodium hexametaphosphate functions as a gelation agent, possibly by sequestering calcium in the pectin compound present in the albedo, bringing about solubilization and gelation of the pectin. Thus, as substitutes for the sodium hexametaphosphate, other materials can be used such as sodium citrate and other water soluble salts or complexes capable of base-exchanging the sodium for the calcium or otherwise functioning as sequestering agents.

It is preferred to add to the albedo paste at this stage one or more flavoring and sweetening agents, such as for example commercial orange flavoring agents, but the addition of water at this point is undesirable and thus it is preferred to use low-moisture content flavoring and sweetening agents. A highly satisfactory sweetening agent is dry corn syrup solids such as that available under the trade name "Frodex." We have found that a delicate orange flavor can be imparted to the final product by the addition at this point of comminuted orange peel flavedo.

The mixture is then spread out in a relatively thin layer on a suitable sheet, such as of stainless steel, and the mixture baked thereon in an oven under appropriate conditions of time and temperature so as to produce a dry, crisp product. The sheets are preferably broken up in the conventional manner to produce flakes. It will be understood to those skilled in the art that the form in which the mixture is baked and the form of the final product may be varied within wide limits in accordance with customary practice in the edible cereal art.

The following specific examples are illustrative of the process of the present invention, but it is to be understood that the invention is not to be limited to the specific details thereof:

*Example 1.*—Pieces of shaved orange albedo from navel oranges were rinsed with water and 375 grams of the rinsed pieces were comminuted for about one minute in a Waring Blendor with 700 ml. of an aqueous solution containing 1.5% of sodium chloride. The resulting mixture was essentially in purée (thin paste) form and the mixture was boiled for ten minutes, and drained and rinsed with water on a 60 mesh screen. About 155 grams of dry corn syrup solids were thoroughly mixed in with the drained mixture and the blend spread out in a layer about 1/16 inch thick on a stainless steel tray and baked in an oven at about 250° F. for about 30 minutes. The tray was removed from the oven, the layer or sheet of material was turned on the tray and baking was continued for an additional 30 minutes.

The finished product was light yellow in color, crisp, and mildly sweet.

*Example 2.*—An orange-flavored cereal product was produced by carrying out the process set forth in Example 1 above, but with the addition of 25 grams of orange flavedo along with the corn syrup solids.

*Example 3.*—The process was the same as described in connection with Example 1 above, but water was used in place of the sodium chloride solution, and about one-half gram of sodium hexamethaphosphate was added to the mixture prior to spreading it for baking.

In carrying out the further modified form of the process, the albedo, free from the flavedo, is first dried under mild temperature conditions such as not to bring about any substantial decomposition of the albedo constituents, for a sufficient length of time to bring the moisture content of the albedo below about 20%. The dried albedo is then ground into a flour and the flour is made up into a paste by the addition of a suitable aqueous medium. Difficulty in wetting the flour is experienced, possibly due in part at least to the presence of calcium in the pectin of the albedo, rendering it insoluble. We have found that if the pectin is solubilized, such as by the addition of sodium citrate to the aqueous medium for replacement of the calcium ions by the sodium ions, the albedo flour can be made up into a cohesive paste of the desirable consistency for the subsequent blending and extruding operations. Other materials which can be used in place of the sodium citrate are sodium hexametaphosphate and other water soluble salts or complexes capable of base-exchanging the sodium for the calcium or otherwise functioning as sequestering agents.

It is preferred at this stage to add to the albedo paste one or more flavoring and sweeting agents such as for example frozen orange concentrate, molasses, honey, and/or other flavoring syrups such as corn, maple, boysenberry, apricot and the like. The paste can be sweetened by the addition of any desired type of sugar, preferably in syrup form. At this stage, it is preferred to add cornstarch or other cereal flour as a source of starch, as well as baking powder or sodium bicarbonate and any other seasonings such as salt.

The flavoring, sweeting and other ingredients as described above are thoroughly blended with the albedo paste, and the resulting mixture is preferably extruded or otherwise shaped or molded into the desired final form, whereupon the shaped paste, now of dough-like consistency, is baked to produce the final product.

Depending upon the specific type of albedo utilized and the processing conditions, including the types of flavoring agents and sweeteners utilized, the final product may have a somewhat bitter taste. If such bitter taste is such as to be undesirable, we have found that any such undesirable bitterness can be removed by pre-treating the albedo pieces prior to the initial drying operation, as by leaching the albedo with room temperature or lukewarm water for a period of approximately 30 minutes, the water preferably containing up to 5% of sodium chloride.

The following specific examples are illustrative of the further modified process of the present invention, but it is to be understood that the invention is not to be limited to the specific details thereof:

*Example 4.*—Pieces of shaved orange albedo were dried in a forced air drying oven pre-heated to 165° F. The oven was vented to admit only a small volume of fresh air. The thermostat was set at 180° F–190° F. and the peel was blanched for one hour. The final temperature was about 165° F. The oven was then cooled to 128° F. and the heat adjusted to this temperature. The air vents were then opened wide to admit ample fresh air, and drying was continued for three hours at 128° F. The albedo pieces were then turned over and allowed to dry two more hours at approximately the same temperature.

The albedo thus dried was ground in a Raymond mill using a ⅛" round hole screen. The coarse flour was then separated on a 60 mesh screen and the fines were remilled using a .024 round hole screen. The coarse material which would not pass through a 60 mesh screen was discarded.

Ten grams of the orange albedo flour resulting from the steps described above were mixed with .75 gram of sodium citrate and 16 grams of distilled water. The resulting paste mixture was allowed to stand 15 minutes.

Ten grams of 42° Brix frozen orange concentrate, 8 grams honey and 3 grams Wesson oil were mixed together and then blended with the orange albedo paste mixture. To this blend was added a mixture of 6 grams cornstarch, 8 grams sugar, 0.5 gram salt and 2 grams baking powder. The final resulting mixture was extruded through ⅛" round holes onto trays and baked at 250° F. for 30 minutes.

The resulting dried product was a pleasant tasting, fairly crisp, rod-shaped cereal that broke up easily when chewed.

*Example 5.*—A cereal product somewhat different in flavor and texture from that prepared in accoradnce with Example 4 above, was prepared by mixing well 10 grams orange albedo flour, 2 grams sugar, ½ gram sodium citrate, 18 grams water and 6 grams of orange concentrate. The resulting paste was allowed to stand for 15 minutes and then 4 grams of vegetable oil and 2 grams of orange concentrate were added. Finally, 2 grams baking powder, 2 grams sugar and 1 gram salt were blended together and mixed with the above mixture. The final mixture was extruded through ⅛" round holes and baked at 250° F. for 30 minutes.

*Example 6.*—A maple syrup-flavored cereal was produced by mixing thoroughly 10 grams of the dried albedo flour, ¾ gram of sodium citrate, 16 grams water and the resulting paste was allowed to stand for about 15 minutes. To this was added 10 grams maple syrup, 8 grams honey and 3 grams vegetable oil, followed by the addition of a mixture of 6 grams cornstarch, 8 grams sugar, ½ gram salt and 2 grams baking powder. The entire mixture was combined quickly and extruded through ⅛" round holes and baked at 250° F. for 30 minutes.

*Example 7.*—An orange confection-type product was prepared by mixing 10 grams of the dried orange albedo flour, 8 grams sugar, 1 gram salt and 1 gram baking powder. To this was added 12 grams frozen orange concentrate, 4 grams honey and 4 grams vegetable oil, and the mixture was thoroughly blended and extruded as in Example 4. The extruded rods were baked at 250° F. for 20 minutes.

Those skilled in the art will readily understand that the specific portions set forth in the examples can be varied considerably in producing products of varying texture and flavor characteristics. For example, the amount of citrus albedo set forth in the examples can be varied at least 50%, relative to the amounts of the other ingredients. The flavoring and sweetening ingredients can of course be varied considerably to produce the desired flavor and degree of sweetness.

We claim:

1. A process for the production of a foodstuff based on citrus albedo, comprising the steps of admixing pieces of citrus albedo substantially free of flavedo with an aqueous medium to form a mixture, boiling said mixture to form a paste, shaping the paste, and baking the shaped paste.

2. A process for the production of a foodstuff based on citrus albedo, comprising the steps of extracting citrus albedo from pieces of albedo with an aqueous medium to produce a paste-like mixture, removing a portion of the liquid from said mixture, and baking the resulting mixture.

3. The process of claim 2, wherein the extraction step is carried out by use of hot water.

4. The process of claim 2, wherein the extraction step is carried out by use of a salt solution.

5. The process of claim 2, wherein the extraction step is carried out by use of a dilute solution of sodium chloride.

6. A process for the production of a foodstuff based on citrus albedo, comprising the steps of comminuting citrus albedo, boiling the comminuted albedo in admixture with an aqueous medium to produce a paste-like mixture, removing at least a portion of the liquid from said mixture and baking the same.

7. The process of claim 6, wherein the aqueous medium is water.

8. The process of claim 6, wherein the aqueous medium is a dilute solution of sodium chloride.

9. The process of claim 2, wherein a minor amount of a sequestering agent for calcium is added to the paste prior to baking.

10. The process of claim 2, wherein a minor amount of sodium hexametaphosphate is added to the paste prior to baking.

11. The process of claim 2, wherein flavoring and sweetening agents are added to the mixture prior to baking.

12. The process of claim 2, wherein orange peel flavedo is added to the mixture prior to baking.

13. The process of claim 2, wherein dry corn syrup solids are added to the mixture prior to baking.

14. A process for the production of a foodstuff based on citrus albedo, comprising the steps of comminuting citrus albedo, boiling the comminuted albedo in admixture with a dilute sodium chloride solution to produce a paste-like mixture, removing free liquid from the mixture, adding a minor amount of sodium hexametaphosphate to the mixture to increase the consistency thereof, forming the mixture into relatively thin sheets, and baking the sheets.

15. A process for the production of a foodstuff based on citrus albedo, comprising the steps of drying citrus albedo substantially free of flavedo, grinding the dried albedo into a flour, adding an aqueous medium to said albedo flour to produce a paste-like mixture, and baking said mixture.

16. A process for the production of a foodstuff based on orange albedo, comprising the steps of drying orange albedo substantially free of flavedo, grinding the dried albedo into a flour, adding an aqueous medium to said albedo flour to produce a paste-like mixture, incorporating flavoring ingredients in said paste-like mixture, and baking said mixture.

17. A process for the production of a foodstuff based on citrus albedo, comprising the steps of drying citrus albedo, grinding the dried albedo into flour, adding an aqueous medium and flavoring ingredients to said albedo flour to produce a paste-like mixture, extruding the mixture in the form of relatively short rods of relatively small diameter, and baking the extruded rods.

18. The process of claim 15, wherein the aqueous medium contains a sequestering agent.

19. The process of claim 15, wherein the citrus albedo contains a compound of calcium and pectin, and wherein the aqueous medium contains sodium ions in an amount sufficient to base-exchange with the calcium, whereby the pectin is solubilized.

20. The process of preparing a paste from citrus albedo flour comprising the step of admixing with said flour a sufficient quantity of an aqueous medium to form a paste, the aqueous medium containing sodium ions in an amount sufficient to base-exchange with the calcium present in the albedo flour.

21. The process of claim 20, wherein the aqueous medium has added thereto sodium citrate.

22. The process of claim 15, wherein the albedo is orange albedo.

References Cited by the Examiner
UNITED STATES PATENTS
2,147,521    2/1939   Bustamante _____ 99—83

A. LOUIS MONACELL, *Primary Examiner.*

R. S. AULL, *Assistant Examiner.*